April 2, 1963            G. H. MESSERLY            3,083,574
PNEUMATIC TEMPERATURE MEASUREMENT AND CONTROL SYSTEM
Filed Dec. 12, 1956                        3 Sheets-Sheet 1
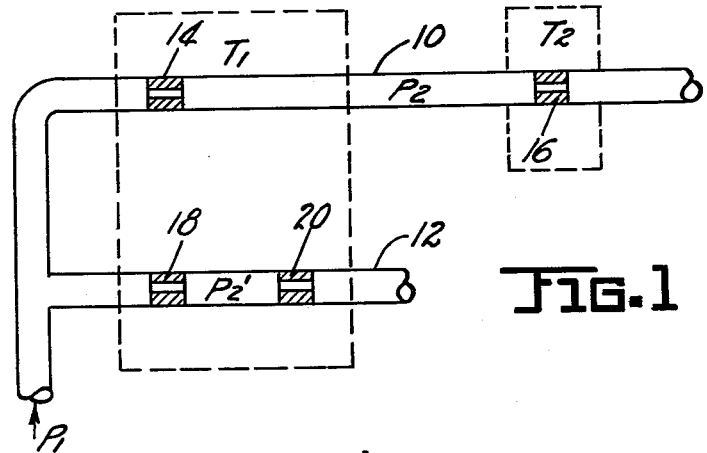
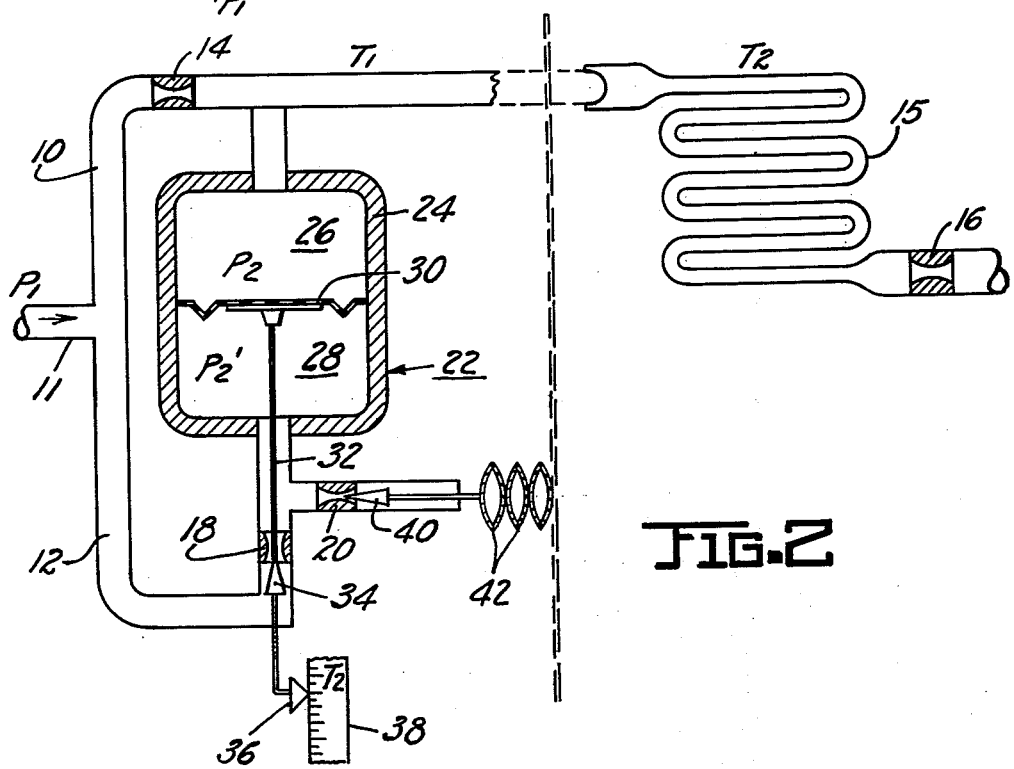
INVENTOR.
GEORGE H. MESSERLY
BY
Robert C. Smith
ATTORNEY INVENTOR.
GEORGE H. MESSERLY
BY
Robert C. Smith
ATTORNEY INVENTOR.
GEORGE H. MESSERLY
BY
Robert C Smith
ATTORNEY

United States Patent Office 3,083,574
Patented Apr. 2, 1963

3,083,574
PNEUMATIC TEMPERATURE MEASUREMENT AND CONTROL SYSTEM
George H. Messerly, South Bend, Ind., assignor to The Bendix Corporation, a corporation of Delaware
Filed Dec. 12, 1956, Ser. No. 627,949
9 Claims. (Cl. 73—357)

This invention relates to temperature sensing and more particularly to a pneumatic means for measuring temperatures and for providing an output signal which can be used in a control system.

In the field of fuel controls for gas turbine engines, ramjets, etc., it is often necessary or desirable to measure combustion temperatures which may approach the temperature limits of the metals in which the combustion process is confined. Thermocouples are often used for this purpose but they have disadvantages in that they tend either to be slow in response if the physical size is large enough to withstand the temperatures involved, or if they are made of lightweight material capable of giving rapid response, they burn out after a short time and thus present a servicing problem. Further, the output signal of a thermocouple usually requires amplification before it can be used to effect a correction in a system. Static gas thermometers wherein a gas is trapped inside a bellows have been used but these systems tend to be slow in response and to require additional calibration to take into consideration the spring rate of the bellows. Pneumatic thermometers have also been used in which gases, the temperature of which it is desired to measure, are caused to flow through a tube having a plurality of restrictions therein, and certain pressures are sensed to give an indication of the temperature of the gas. These systems have disadvantages because it is necessary to bring the extremely hot gases from a combustion chamber, directly into the system. These combustion gases contain considerable components and solids which upset calibration. It is, therefore, an object of the present invention to provide a pneumatic temperature sensor in which the properties of the sensing fluid (no condensibles or solids) which flows through the orifices is such that calibration is more precise than is the case with pneumatic systems presently in use.

It is another object to provide a pneumatic temperature sensing system in which inaccurate and calibration difficulties caused by bellows, spring rates etc., are at a minimum.

It is another object to provide a pneumatic temperature sensor which is durable and capable of withstanding great extremes of temperature.

It is another object to provide a pneumatic temperature sensor in which response times are sufficiently short to enable it to be used to sense combustion temperatures in engines and to provide a direct pneumatic signal of sufficient energy that it may be used directly to cause a correction in a control system.

It is another object to provide a temperature sensor which may be made in a very small and light package.

It is another object to provide a pneumatic temperature sensor which will retain its calibration despite some changes in volume of gas chambers.

It is a further object of the present invention to provide a temperature responsive system in which the output may be any of a number of arbitrary functions of temperature.

Other objects and advantages will become apparent from the following description taken in connection with the following drawings, in which:

FIGURE 1 is a schematic drawing illustrating generally the principle of my invention;

FIGURE 2 is a schematic drawing of one form of my invention in which compensating means are provided for changing inlet temperatures;

Figure 3:
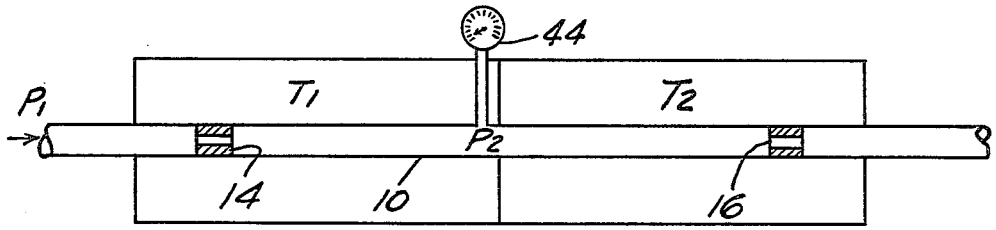
FIGURE 3 is a schematic drawing illustrating a modified form of my invention.

Referring to FIGURE 1, gas flow is directed through two conduits 10 and 12 arranged in parallel. Conduit 10 has a pair of restrictions 14, 16 in series and conduit 12 has a pair of restrictions 18, 20 in series. The gas supplied to the conduits 10 and 12 is from a common source at a pressure $P_1$. This pressure is preferably high enough so that flow through all of the restrictions is sonic; i.e. the pressure ratio across each orifice is equal to or greater than approximately two. The gas flow through restrictions 14, 18 and 20 is maintained at a constant known temperature $T_1$. Flow through restriction 16 is maintained at the temperature which it is desired to measure, $T_2$. Enough length of conduit 10 upstream of restriction 16 must be exposed to temperature $T_2$ to cause the temperature of the gas flowing through the conduit to be stabilized at temperature $T_2$. With the arrangement of FIGURE 1, temperature $T_2$ may be determined as shown below. For sonic flow conditions, the gas flow through an orifice is defined by the following equation:

$$W = \frac{CAP}{\sqrt{T}}$$

where $W$ = weight of gas
$C$ = a constant
$A$ = area of orifice
$P$ = pressure upstream of the orifice
$T$ = absolute temperature of the gas The flow through orifices 14 and 16 is the same, therefore $$W = \frac{C_1 A_{14} P_1}{\sqrt{T}} = \frac{C_2 A_{16} P_2}{\sqrt{T}}$$

where $C_1$ = constant associated with restriction 14
$C_2$ = constant association with restriction 16
$P_1$ = pressure upstream of restriction 14
$P_2$ = pressure upstream of restriction 16
$T_1$ = absolute temperature of gas flow through restriction 14
$T_2$ = absolute temperature of gas flow through restriction 16.

Where $$\frac{C_2}{C_1} = C_3$$

solving for $P_1$ is as follows:

$$P_1 = \frac{C_3 A_{16}}{A_{14}} P_2 \sqrt{\frac{T_1}{T_2}}$$

The flow through orifices 18 and 20 is the same $$W = \frac{C_4 A_{18} P_1}{\sqrt{T_1}} = \frac{C_5 A_{20} P_2'}{\sqrt{T_1}}$$

where $C_4$ = constant associated with restriction 18
$C_5$ = constant associated with restriction 20
$P_1$ = pressure upstream of restriction 18
$P_2'$ = pressure upstream of restriction 20

$T_1$ = absolute temperature of gas flow through restrictions 18 and 20.

where $$\frac{C_5}{C_4} = C_6$$

solving for $P_1$ is as follows:

$$P_1 = \frac{C_6 A_{20} P_2'}{A_{18}}$$

Therefore, $$\frac{C_3 A_{16} P_2}{A_{14}} \sqrt{\frac{T_1}{T_2}} = \frac{C_6 A_{20} P_2'}{A_{18}}$$

Because the areas of orifices 14, 16, 18 and 20 can be made such that $$\frac{A_{16}}{A_{14}} = \frac{A_{20}}{A_{18}}$$

and because the constants, which are essentially the discharge coefficients of the orifices would be the same, these factors will cancel leaving $$\frac{P_2'}{P_2} = \sqrt{\frac{T_1}{T_2}}$$

then $$T_2 = \left(\frac{P_2}{P_2'}\right)^2 T_1$$

In the systems of FIGURE 1, the temperature $T_1$ is known and constant. $T_2$ will then vary directly as the square of the ratio of the pressures.

In FIGURE 2 is shown one form of my invention utilizing the foregoing theory of operation. In this figure, those parts which are the same as those of FIGURE 1 have been given the same numbers. A gas at a pressure $P_1$ and a known temperature $T_1$ is supplied to a conduit 11 which branches into a conduit 10 and a conduit 12. Gas flow in conduit 10 passes through a restriction 14 and, while flowing through a heat exchanger 15 which is actually part of conduit 10 it is raised to temperature $T_2$ before flowing through restriction 16. Gas in conduit 12 flows through a variable restriction 18 and a variable restriction 20. Flow through all restrictions is sonic. Connected to conduits 10 and 12 downstream of restrictions 14 and 18, respectively, is a pressure ratio sensing device 22 consisting of a housing 24 separated into two chambers 26 and 28 by means of a diaphragm 30. The pressure in chamber 26 is $P_2$ pressure and varies with changes in $T_2$ as set forth above. Chamber 28 contains gas at $T_1$ temperature and $P_2'$ pressure. The difference between pressures $(P_2 - P_2')$ is sensed by the diaphragm 30 which assumes a position in housing 24 such that $P_2 = P_2'$. It will be remembered that according to the mathematical relation set forth above the temperature sensed varies with $P_2/P_2'$. However, where a pressure difference system is used such that $P_2 = P_2'$, the position of the diaphragm will be the same as in the case of a ratiometer stabilized such that $P_2/P_2' = 1$. A rod 32 connected to diaphragm 30 carries a contoured needle 34 for varying the effective area of orifice 18, and a pointer 36 which provides a reading on a temperature scale 38. With proper contouring of needle 34, the scale 38 may be read directly in terms of temperature $T_2$.

As indicated above, the device of FIGURE 1 was based on the presumption that $T_1$ was known and constant. In practical situations there are many cases where this assumption cannot be made valid, there being no convenient source of constant reference temperature. Changes in $T_1$ temperature may be compensated for by making the $P_2'$ pressure vary with changing $T_1$. If the area of restriction 20 is made variable by means of a contoured valve member 40, the contour may be made an arbitrary function of $T_1$. Movement of member 40 may be controlled through the action of any of a number of differential thermal expansion devices. In the present instance, this has been shown as a series of bi-metallic discs 42 which expand and contracts with changes in $T_1$, thereby moving member 40 such that pressure $P_2'$ is caused to vary with $T_1$.

In FIGURE 3 is shown a system similar to that of FIGURES 1 and 2 wherein the structure is greatly simplified. Where $T_1$ is known and constant and $P_1$ is regulated to a known constant value, it is possible to utilize a single conduit 10 having restrictions 14 and 16 in series. It is further required that the temperature of the gas flow through restriction 16 be stabilized at temperature $T_2$. When flow through both orifices is sonic, $$W = \frac{C_1 P_1 A_{14}}{\sqrt{T_1}} = \frac{C_2 P_2 A_{16}}{\sqrt{T_2}}$$

solving for $T_2$ $$T_2 = C_7 T_1 \left(\frac{P_2 A_{16}}{P_1 A_{14}}\right)^2$$

If $P_1$ is regulated to be equal to $C_3 T_1$ or if $T_1$ and $P_1$ are held constant and $A_{16}/A_{14}$ is a constant built into the system as a factor of unity, then $T_2$ varies directly with $P_2^2$. Therefore, a pressure gauge 44 responsive to $P_2$ may be calibrated in terms of $T_2$.

Figure 4:
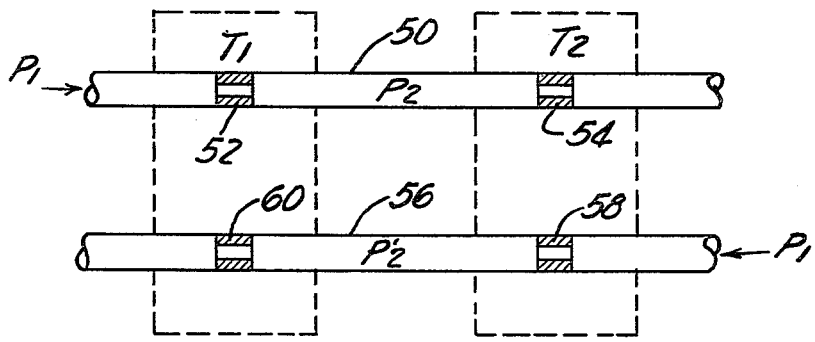
FIGURE 4 is a schematic drawing showing an alternate arrangement of my invention.

In FIGURE 4 is shown an alternate arrangement which results in a particularly convenient relationship between the intermediate pressures in the pneumatic circuits and the absolute temperature ratio. In this case, the gas flow through the upper conduit, to which will be assigned numeral 50, is the same as with conduit 10 of FIGURE 1; i.e., flow is from a source at a pressure $P_1$ and a known reference temperature $T_1$ through a restriction 52 and then through enough length of conduit 50 so that gas flow through the second restriction in series 54 is stabilized at the unknown temperature $T_2$. Flow through the other conduit 56 is from the high pressure source $P_1$ such that the gas temperature reaches $T_2$ before flowing through the first orifice, 58. This flow then continues through the conduit 56 until it enters a portion of said conduit at temperature $T_1$. This portion is sufficiently long that flow through the second orifice, 60 is stabilized at temperature $T_1$. If the intermediate pressures in conduits 50 and 56 are assigned values of $P_2$ and $P_2'$, respectively, the resulting relationships are as set forth below:

In conduit 50, the flow relationship is exactly the same as in conduit 10 of FIGURE 1. Weight of gas flow then, is as set forth below:

$$W = \frac{C_1 A_{52} P_1}{\sqrt{T_1}} = \frac{C_8 A_{54} P_2}{\sqrt{T_2}}$$

solving for $P_1$, $$P_1 = C_9 P_2 \left(\frac{A_{54}}{A_{52}}\right) \sqrt{\frac{T_1}{T_2}}$$

In conduit 56 flow is as set forth below:

$$W = C_{10} \left(\frac{P_1 A_{58}}{\sqrt{T_2}}\right) = C_{11} \left(\frac{P_2' A_{60}}{\sqrt{T_1}}\right)$$

solving for $P_1$ and canceling the constants as set forth above, $$P_1 = P_2' \frac{A_{60}}{A_{58}} \sqrt{\frac{T_2}{T_1}}$$

therefore, $$P_2 \frac{A_{54}}{A_{52}} \sqrt{\frac{T_1}{T_2}} = P_2' \frac{A_{60}}{A_{58}} \sqrt{\frac{T_2}{T_1}}$$

$$P_2 \frac{A_{54}}{A_{52}} = P_2' \frac{A_{60}}{A_{58}} \frac{T_2}{T_1}$$

$$T_2 = T_1 \left(\frac{A_{54}}{A_{52}}\right)\left(\frac{A_{58}}{A_{60}}\right)\left(\frac{P_2}{P_2'}\right)$$

The areas of orifices 52, 54, 58 and 60 may be calibrated so that the above area factor is 1.

Therefore, $$T_2 = T_1 \left( \frac{P_2}{P_2'} \right)$$

If $T_1$ is known, then $T_2$ is directly proportional to the pressure ratio $P_2/P_2'$.

Figure 5:
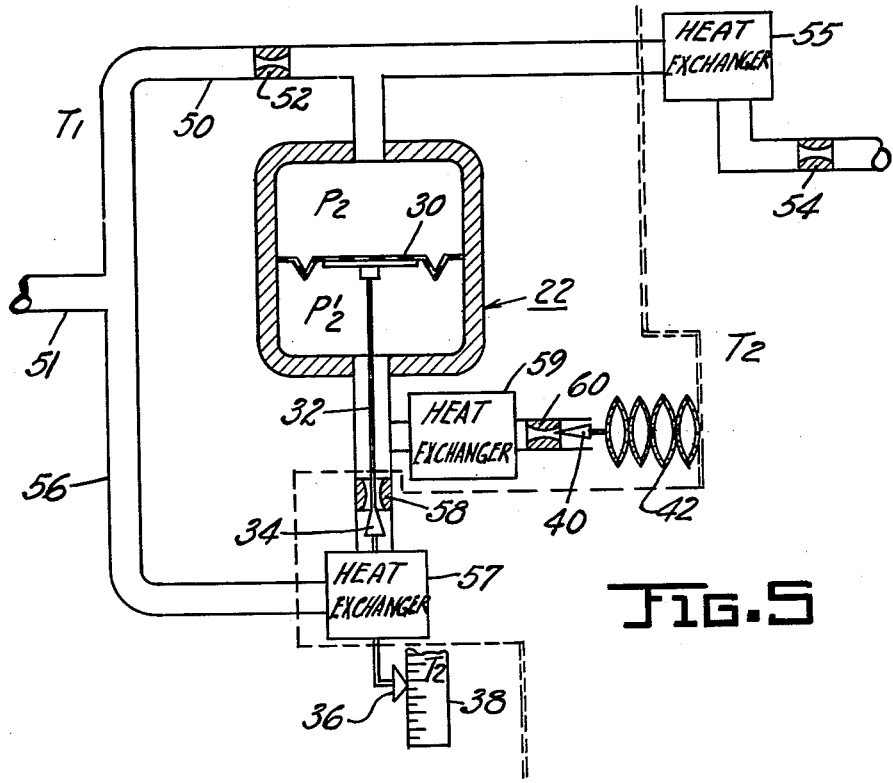
FIGURE 5 is a schematic drawing illustrating a modification of the device of FIGURE 2 to embody the gas flow relationships of FIGURE 4.

An instrument similar to that shown in FIGURE 2 is used in FIGURE 5, except that it utilizes the flow relationship of FIGURE 4. Gas under pressure $P_1$ sufficient to cause sonic flow through all the orifices is supplied to a conduit 51 which branches into conduits 50 and 56. Flow through conduit 50 is directed through two restrictions in series, a restriction 52 through which flow is maintained at temperature $T_1$ and a restriction 54 through which flow at temperature $T_2$ is directed, said temperature being established by means of a heat exchanger 55. Flow through conduit 56 is first into the $T_2$ region where the gas is stabilized at $T_2$ temperature by means of a heat exchanger 57 before being supplied to restriction 58, thence another heat exchanger 59 at temperature $T_1$ before flowing through restriction 60. Connected to conduits 50 and 56 downstream of restrictions 52 and 58, respectively, is the pressure sensing device 22 which is exactly the same as that shown in FIGURE 2. Movement of the diaphragm 30 causes movement of rod 32 with changes in the pressures $P_2$ and $P_2'$. Rod 32 carries a contoured needle 34 for varying the effective area of restriction 58, and a pointer 36 which provides a reading on a temperature scale 38. In this case if the $T_2$ scale is linear the contour of needle 34 must provide for linear travel of rod 32 with $P_2-P_2'$. Compensation for changing $T_1$ is provided as in the FIGURE 2 device, through the action of a contoured needle 40 which varies the effective area of restriction 60 with changes in the position of the movable end of bellows 42 which is responsive to changes in $T_1$ as previously discussed.

Figure 6:
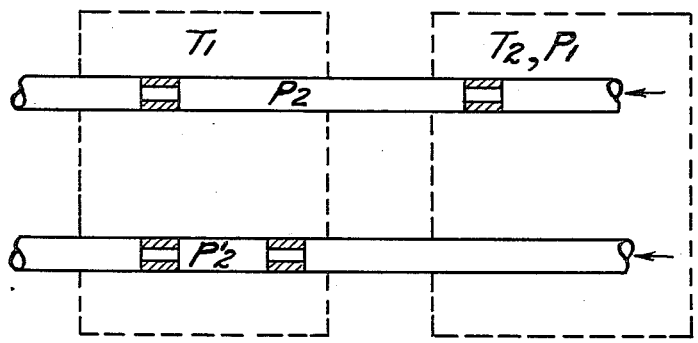
FIGURE 6 is a schematic drawing of a modification of the device of FIGURE 1.
Figure 7:
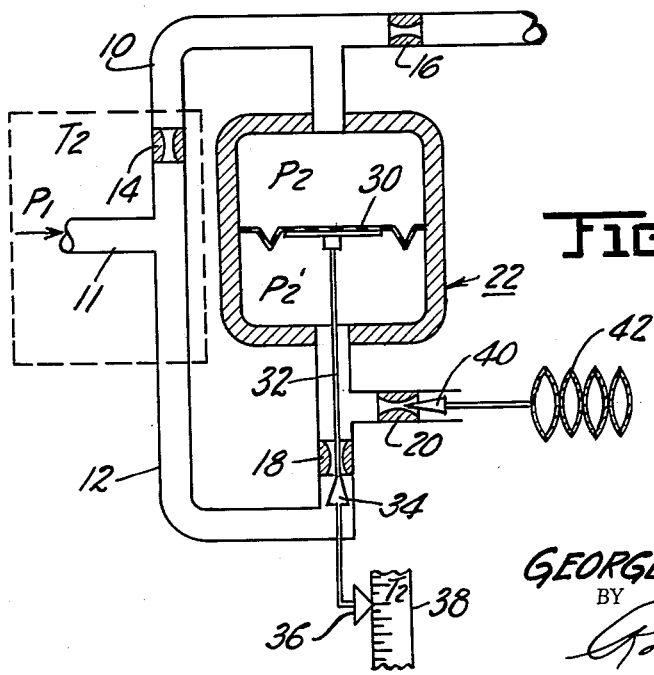
FIGURE 7 is a schematic drawing illustrating a modification of the device of FIGURE 2 to embody the gas flow relationships of FIGURE 6.

If it is required to measure the temperature of a gas which is itself at a sufficiently high pressure, and can conveniently be tapped for the purpose, the arrangement shown in FIGURE 6 can be used. With this arrangement the temperature and pressure relationships are analogous to those of the devices of FIGURES 1 and 2 and the temperature can be measured by means of a device like that of FIGURE 7. The device of FIGURE 7 is essentially the same as that of FIGURE 2 and the parts are numbered accordingly. Gas at pressure $P_1$ and temperature $T_2$ is supplied to conduit 11 and thence to each of conduits 10 and 12. Flow through restriction 14 in conduit 10 is maintained at $T_2$ and is then allowed to cool to temperature $T_1$ before flowing through restriction 16. Temperature of the flow through conduit 12 is allowed to cool, such that flow through both of restrictions 18 and 20 is at temperature $T_1$. The diaphragm 30 then senses the pressure difference as described above and, if the central valve member 34 and the restriction 18 are calibrated as in FIGURE 2, movement of rod 32 and, hence, pointer 36 should be linear with $(P_2'/P_2)^2$ and scale 38 can be given a linear calibration in terms of temperature. The bellows 42 acts to vary the position of needle 40 with changes in temperature $T_1$ as described above.

The above system, by using the gasses, e.g., combustion gasses, directly avoids the requirement of supplying a separately introduced gas and bringing it into thermal equilibrium at temperature $T_2$. However, it has the disadvantage that the gas properties (condensation, specific heat ratio) may vary, causing uncompensated errors; that the pressure available in the $T_2$ zone may not be favorable, and that the calibration may be upset by the condensation of moisture or the presence of solid particles.

While a number of embodiments have been shown, it will be recognized that any one of these may be made in any of several forms depending upon the requirements of a particular application. It will be apparent from the foregoing that the pressure function which it is ultimately desired to utilize is the ratio $P_c'/P_c$; however, where the system is used as part of an over-all control system it is sometimes more convenient to utilize a pressure sensor which provides an output varying with $P_2-P_2'$ as shown and described herein. This is especially true where the temperature signal is used simply to provide an overriding function when temperatures in excess of a certain value are sensed. One reason for this is that pressure difference sensing structure is usually simpler and less subject to inaccuracies than are pressure ratio sensors.

I claim:

1. An instrument for the measurement of a temperature comprising a first conduit connected to a source of gas under pressure having a pair of fixed area restrictions in series, said first conduit being exposed over a portion of its length to the temperature to be measured and over another portion of its length to a known reference temperature, one of said restrictions being located in said portion exposed to the measured temperature, said portion acting to stabilize the temperature of the gas flow through said restriction at said temperature to be measured, the other of said restrictions being located in said other portion exposed to said known reference temperature, said other portion acting to maintain the temperature of the gas flow through said other restriction at said known reference temperature, a second conduit connected to said source of gas under pressure having a pair of restrictions in series, a pressure responsive device, first and second passages communicating said pressure responsive device with said first and second conduits, respectively, at a point between the respective pair of series restrictions contained therein, said pressure responsive device being responsive to the differential between gas pressures existing between each of said pair of restrictions in series, which pressure differential varies as a predetermined function of said measured temperature, means operatively connected to said pressure responsive device and one of the restrictions in said second conduit for varying the effective area of said one restriction in response to said pressure differential, and means responsive to variations in said known reference temperature operatively connected to the other of said restrictions in said second conduit for varying the effective area of said other restriction as a function of said known reference temperature.

2. An instrument for the measurement of a temperature as set forth in claim 1 wherein said second conduit is exposed over a portion of its length to the temperature to be measured and said one of the restrictions in said second conduit is also located in said portion of said second conduit, said portion acting to stabilize the temperature of the gas flow through said one restriction at the temperature which it is desired to measure.

3. An instrument for the measurement of a temperature as set forth in claim 1 wherein said means for varying the effective area of said one restriction in said second conduit includes a valve member positioned linearly as an arbitrary function of said pressure differential and thus said measured temperature.

4. An instrument for the measurement of a temperature as claimed in claim 1 wherein said second conduit is exposed over a portion of its length to said known reference temperature and said one of the restrictions in said second conduit is also located in said portion of said second conduit, said portion acting to stabilize the temperature of the gas flow through said one restriction at said known reference temperature.

5. An instrument for the measurement of a temperaure as claimed in claim 1 wherein said second conduit is exposed over a first portion of its length to said temperature to be measured and over a second portion of its length to said known reference temperature, said first portion containing said one restriction in said second conduit such that the gas flow therethrough is stabilized at said temperature to be measured, said second portion containing said other restriction in said second conduit such that the gas flow therethrough is stabilized at said known reference temperature.

6. An instrument for the measurement of a temperature as claimed in claim 1 wherein said one restriction in said first conduit is upstream from said first passage and said other restriction in said first conduit is downstream from said first passage.

7. An instrument for the measurement of a temperature as claimed in claim 1 wherein said one restriction in said first conduit is downstream from said first passage and said other restriction in said first conduit is upstream from said first passage.

8. An instrument for the measurement of a temperature comprising a first conduit connected to a source of gas under pressure having a pair of fixed area restrictions in series, said conduit being exposed to the temperature to be measured and to a known reference temperature, said restrictions being positioned in said conduit such that the gas flow through one is stabilized at the temperature to be measured and the gas flow through the other is maintained at said reference temperature, said gas flow through said one restriction varying as a predetermined function of the temperature to be measured, a second conduit connected to said source of gas under pressure having two restrictions in series, said second conduit being exposed to said reference temperature, said second conduit acting to maintain the temperature of the gas flow through said two restrictions in said second conduit at the reference temperature, a pressure measuring device connected to both of said conduits and responsive to the gas pressures existing between each of said pair of restrictions in series, which pressure relationship varies as a predetermined function of said measured temperature, and means including a valve member operatively connected to said measuring device and the first of said restrictions in said second conduit for varying the effective area of the first of said series restrictions in the second conduit in response to the gas pressures sensed by said pressure measuring device.

9. An instrument for the measurement of a temperature comprising first and second conduits, both of which are supplied from a source of gas at a temperature to be measured, said first conduit having two fixed area restrictions in series and the first of said restrictions being so located that the gas flowing therethrough is stabilized at the temperature to be measured, said second conduit having two restrictions in series and being exposed to a known temperature such that the gas flow through said two restrictions therein is maintained at said known temperature, and a pressure sensing device connected to said first conduit between its two said restrictions and to said second conduit between its two said restrictions, the ratio of said pressures being a known function of said temperature to be measured.

References Cited in the file of this patent
UNITED STATES PATENTS

| | | |
|---|---|---|
| 2,249,751 | Doll | July 22, 1941 |
| 2,263,335 | Heinz | Nov. 18, 1941 |
| 2,266,566 | Poole | Dec. 16, 1941 |
| 2,390,252 | Hayward | Dec. 4, 1945 |
| 2,549,621 | Moore | Apr. 17, 1951 |
| 2,549,624 | Moore | Apr. 17, 1951 |
| 2,549,625 | Moore | Apr. 17, 1951 |
| 2,589,251 | Heinz | Mar. 18, 1952 |
| 2,606,420 | Moore | Aug. 12, 1952 |

FOREIGN PATENTS

| | | |
|---|---|---|
| 1,024,019 | France | Jan. 7, 1953 |
| 90,639 | Sweden | Oct. 26, 1937 |